（12) United States Patent
Green et al.

(10) Patent No.: US 10,008,874 B2
(45) Date of Patent: Jun. 26, 2018

(54) APPARATUS, SYSTEM AND METHOD OF WIRELESS POWER TRANSFER

(71) Applicant: INTEL CORPORATION, Santa Clara, CA (US)

(72) Inventors: Evan R. Green, Tualatin, OR (US); Adam D. Rea, Seattle, WA (US)

(73) Assignee: INTEL CORPORATION, Santa Clara, CA (US)

( * ) Notice: Subject to any disclaimer, the term of this patent is extended or adjusted under 35 U.S.C. 154(b) by 76 days.

(21) Appl. No.: 14/780,009

(22) PCT Filed: Dec. 27, 2013

(86) PCT No.: PCT/US2013/077904
§ 371 (c)(1),
(2) Date: Sep. 25, 2015

(87) PCT Pub. No.: WO2015/009329
PCT Pub. Date: Jan. 22, 2015

(65) Prior Publication Data
US 2016/0049825 A1     Feb. 18, 2016

Related U.S. Application Data

(60) Provisional application No. 61/856,219, filed on Jul. 19, 2013.

(51) Int. Cl.
*H02J 7/00*     (2006.01)
*H01F 27/42*    (2006.01)
(Continued)

(52) U.S. Cl.
CPC ............... *H02J 7/025* (2013.01); *H02J 7/04* (2013.01); *H02J 17/00* (2013.01); *H02J 50/12* (2016.02); *H02J 50/80* (2016.02)

(58) Field of Classification Search
CPC ................. H02J 7/025; H04B 5/0037
(Continued)

(56) References Cited

U.S. PATENT DOCUMENTS 5,734,254 A * 3/1998 Stephens ............... H02J 7/025
320/106
6,473,070 B2 * 10/2002 Mishra ............... G06F 3/0346
345/156
(Continued)

FOREIGN PATENT DOCUMENTS

EP    1432097    6/2004
GB    2414121    11/2005
(Continued)

OTHER PUBLICATIONS

Office Action for Japanse Patent Application No. 2016-518314, dated Jan. 4, 2017, 6 pages (Including 3 pages of English translation).
(Continued)

*Primary Examiner* — M'Baye Diao
(74) *Attorney, Agent, or Firm* — Shichrur & Co.

(57) ABSTRACT

Some demonstrative embodiments include apparatuses, systems and/or methods of wireless power transfer. For example, an apparatus may include a controller to control a Wireless Power Transmitter (WPT) to transmit a sequence of probes during a detection period, to detect a Wireless Power Receiver (WPR) based on a detected induced load on the WPT during transmission of probe of the sequence of probes, and, upon detection of the WPR, to control the WPT to transmit a wireless charging signal to the WPR.

21 Claims, 4 Drawing Sheets

(51) Int. Cl.
  *H04B 1/38* (2015.01)
  *H02J 7/02* (2016.01)
  *H02J 17/00* (2006.01)
  *H02J 7/04* (2006.01)
  *H02J 50/12* (2016.01)
  *H02J 50/80* (2016.01)

(58) Field of Classification Search
  USPC ........ 320/108; 307/104; 455/41.1, 41.2, 573
  See application file for complete search history.

(56) References Cited

U.S. PATENT DOCUMENTS

| | | | |
|---|---|---|---|
| 8,989,657 B2 * | 3/2015 | McManus | H04B 5/02 343/866 |
| 2010/0133917 A1 | 6/2010 | Sekino et al. | |
| 2010/0253442 A1 * | 10/2010 | Mu | H03J 3/20 333/17.1 |
| 2010/0262846 A1 | 10/2010 | Sato | |
| 2011/0136452 A1 * | 6/2011 | Pratt | H03F 1/3241 455/127.1 |
| 2012/0025624 A1 * | 2/2012 | Lee | H02J 7/025 307/104 |
| 2012/0149303 A1 | 6/2012 | Moes et al. | |
| 2012/0153742 A1 | 6/2012 | Lee et al. | |
| 2012/0163492 A1 | 6/2012 | Banin et al. | |
| 2012/0293007 A1 | 11/2012 | Byun et al. | |
| 2012/0299389 A1 | 11/2012 | Lee et al. | |
| 2012/0300875 A1 | 11/2012 | Kwon et al. | |
| 2012/0306269 A1 | 12/2012 | Kim et al. | |
| 2013/0063083 A1 | 3/2013 | Park et al. | |
| 2013/0093257 A1 | 4/2013 | Goto | |
| 2013/0099734 A1 | 4/2013 | Lee et al. | |
| 2013/0127410 A1 | 5/2013 | Park et al. | |
| 2013/0147281 A1 | 6/2013 | Kamata | |
| 2013/0154557 A1 * | 6/2013 | Lee | H04B 5/0037 320/108 |
| 2013/0181539 A1 | 7/2013 | Muratov et al. | |
| 2013/0183898 A1 * | 7/2013 | Strid | H04B 5/0037 455/41.1 |
| 2014/0225452 A1 * | 8/2014 | Kozaki | H02J 5/005 307/104 |
| 2016/0043563 A1 * | 2/2016 | Porat | H02J 7/025 307/104 |

FOREIGN PATENT DOCUMENTS

| | | |
|---|---|---|
| JP | 2007537688 | 12/2007 |
| JP | 2010104203 | 5/2010 |
| JP | 2010178473 | 8/2010 |
| JP | 2011019373 | 1/2011 |
| JP | 2013062895 | 4/2013 |
| JP | 5431033 | 3/2014 |
| KR | 20120132225 | 12/2012 |
| KR | 20120135084 | 12/2012 |
| WO | 2012015838 | 2/2012 |
| WO | 2013042570 | 3/2013 |

OTHER PUBLICATIONS

Office Action for Korean Patent Application No. 2015-7035912, dated Jan. 12, 2017, 12 pages (Including 6 pages of English translation).
Office Action for Korean Patent Application No. 2015-7035940, dated Jan. 13, 2017, 21 pages (Including 12 pages of English translation).
Office Action for Japanse Patent Application No. 2016-521396, dated Jan. 4, 2017, 8 pages (Including 4 pages of English translation).
System Description Wireless Power Transfer vol. I: Low Power, Part 1: Interface Definition, Version 1.1.1, Jul. 2012, 247 pages.
International Search Report and Written Opinion for PCT/US2013/077904, dated Apr. 8, 2014, 10 pages.
International Preliminary Report on Patentability for PCT/US2013/077904, dated Jan. 28, 2016, 7 pages.
International Search Report and Written Opinion for PCT/US2013/077903, dated Apr. 8, 2014, 11 pages.
International Preliminary Report on Patentability for PCT/US2013/077903, dated Jan. 28, 2016, 8 pages.
European Search Report for European Patent Application No. 13889634.5 dated Feb. 15, 2017, 7 pages.
European Search Report for European Patent Application No. 13889567.7 dated Feb. 16, 2017, 7 pages.
Office Action for Korean Patent Application No. 2015-7035912, dated Jul. 26, 2017, 6 pages (Including 3 pages of English translation).
Office Action for Japanese Patent Application No. 2016-521396, dated Jun. 20, 2017, 5 pages (Including 3 pages of English translation).
Office Action for U.S. Appl. No. 14/780,004 dated Oct. 2, 2017, 17 pages.
Office Action for European Patent Application No. 13889567.7, dated Dec. 8, 2017, 4 pages.
Office Action for European Patent Application No. 13889634.5, dated Jan. 15, 2018, 5 pages.
Office Action for Korean Patent Application No. 2015-7035912, dated Jan. 30, 2018, 6 pages. (Including 3 pages of English translation).
Office Action for Korean Patent Application No. 2015-7035912, dated Apr. 5, 2018, 6 pages (Including 3 pages of English translation).

* cited by examiner

US 10,008,874 B2

APPARATUS, SYSTEM AND METHOD OF WIRELESS POWER TRANSFER

CROSS REFERENCE

This application is a National Phase Application of PCT/US2013/077904, filed on Dec. 27, 2013, which claims the benefit of and priority from U.S. Provisional Patent Application No. 61/856,219 entitled "Techniques Allowing Physical Sensing in Wireless Charging to Reduce Standby Power", filed Jul. 19, 2013, the entire disclosures of which are incorporated herein by reference.

TECHNICAL FIELD

Some demonstrative embodiments relate to wireless power transfer.

BACKGROUND

Wireless technology continues to evolve, and with it so does the wide array of devices available in the marketplace. Further to emerging cellular handsets and Smartphones that have become integral to the lives of consumers, existing applications not traditionally equipped with any means to communicate are becoming wirelessly-enabled. For example, various industrial, commercial and/or residential systems may employ wireless communication for the purposes of monitoring, medical, reporting, control, etc.

As the application of wireless communication expands, the powering of wireless devices may become a concern. This concern falls mainly in the realm of mobile communication devices wherein the expanding applicability of wireless communication implies a corresponding increase in power consumption. One way, in which the power problem may be addressed is by increasing battery size and/or device efficiency. Development in both of these areas continues, but may be impeded by the desire to control wireless device size, cost, etc.

Another manner by which mobile wireless device power consumption may be addressed is by facilitating easier recharging of devices. In existing systems, battery-driven devices must be periodically coupled to another power source, e.g., grid power, solar power, fuel cell, and the like, for recharging. Typically this involves maintaining a recharger specific to the device being charged, and mechanically coupling the device to a charging cord for some period of time.

Developments in the area of recharging are being developed to replace this cumbersome process. For example, wireless charging may remove the requirement of having charging equipment corresponding to a particular device to be charged.

Wireless power transfer has the potential to transform electronics by "cutting the last cord," freeing users from the need to plug in to recharge devices, and changing the design space, for example, by enabling devices with no connectors.

However, standby power consumption of wireless charging systems currently is too high due to the necessity to communicate between a charger device and a device to be charged. Thus, there are general needs for techniques to reduce power consumption in wireless charging systems.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
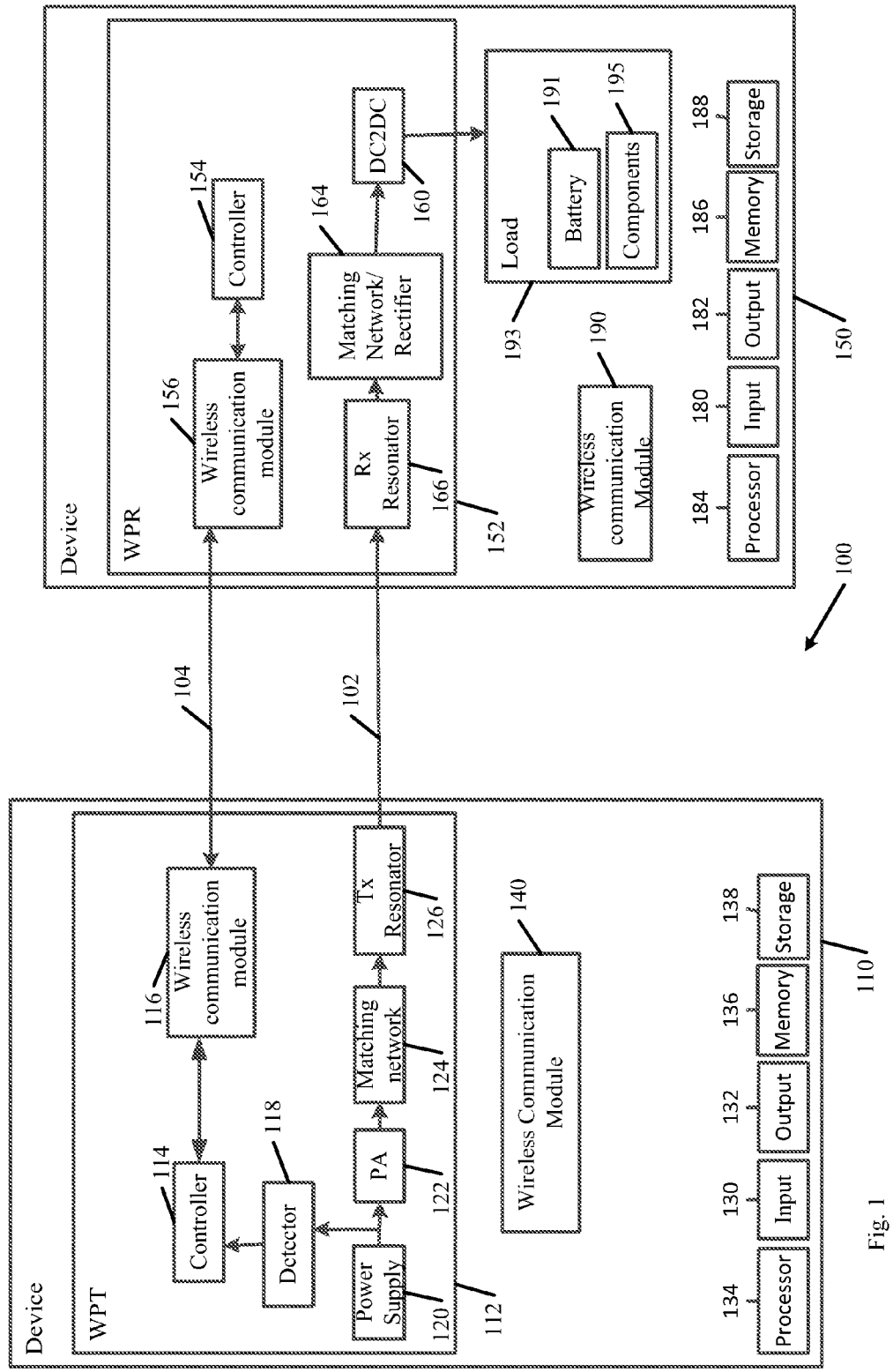
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a peripheral device, a Personal Digital Assistant (PDA) device, a handheld PDA device, a wireless charging device, an on-board device, an off-board device, a hybrid device, a vehicular device, a non-vehicular device, a mobile or portable device, a consumer device, a non-mobile or non-portable device, a wireless communication station, a wireless communication device, a video device, an audio device, an audio-video (A/V) device, a peripheral device, and the like.

Some embodiments may be used in conjunction with devices and/or systems operating in accordance with existing Alliance for Wireless Power (A4WP) Specifications (*A4 WP Wireless Power Transfer System Baseline System Specification (BSS) Proposal Version* 1.0.4, Mar. 6, 2013) and/or future versions and/or derivatives thereof, devices and/or systems operating in accordance with existing Wireless Power Consortium (WPC) Specifications (including *"System Description, Wireless Power Transfer, Volume I: Low Power, Part* 1*: Interface Definition, Version* 1.1.1, *July* 2012) and/or future versions and/or derivatives thereof, devices and/or networks operating in accordance with wireless charging Specifications, wireless transfer Specifications, units and/or devices which are part of the above systems, and the like.

The phrase "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Reference is now made to FIG. 1, which schematically illustrates a system 100, in accordance with some demonstrative embodiments.

As shown in FIG. 1, in some demonstrative embodiments, system 100 may include at least one device 110 ("charging device") configured to transmit at least one wireless power signal 102 to be received by at least one device 150, e.g., to charge device 150, as described below. In some embodiments, as shown in FIG. 1, device 110 may transmit wireless power signal 102 to a single device 150. In other embodiments, device 110 may transmit at least one wireless power signal 102 to be received by a plurality of devices, e.g., to charge the plurality of devices simultaneously or sequentially.

In some demonstrative embodiments, device 110 may include a Wireless Power Transmitter (WPT) 112 configured to transmit wireless power signal 102, and device 150 may include a Wireless Power Receiver (WPR) 152 configured to receive wireless power signal.

In some demonstrative embodiments, WPR 152 may be configured to provide power to at least one device load 193 of device 150.

In some demonstrative embodiments, device 150 may be a battery-powered device.

In one example, load 193 may include a battery 191 of device 150. For example, WPR 152 may be configured to provide power to charge battery 191.

For example, device 150 may include a mobile phone, a Smartphone, a watch, a mobile computer, a laptop computer, a tablet computer, an Ultrabook™ computer, a notebook computer, a video device, a display device, a handheld computer, a handheld device, a PDA device, a handheld PDA device, a hybrid device (e.g., combining cellular phone functionalities with PDA device functionalities), a consumer device, a vehicular device, a non-vehicular device, a mobile or portable device, a cellular telephone, a Personal Communication Systems (PCS) device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, an audio device, an A/V device, a Personal Media Player (PMP), a digital video camera (DVC), a digital audio player, a Digital Still camera (DSC), a media player, a music player, or the like.

In other embodiments, device 150 may include a device, e.g., a peripheral device, which may be configured to directly consume the power received from device 110.

In one example, load 193 may include one or more components 195 of device 150, which may be configured to utilize the power provided by WPR 152. For example, WPR 152 may be configured to provide power to be consumed by the one or more components 195.

For example, device 150 may include a wireless mouse, a wireless keyboard, a wireless storage device, a wireless sensor device, a wireless audio device, a wireless speaker device, a wireless microphone, a wireless joystick, a trackball, a remote control, and the like.

In some demonstrative embodiments, device 110 may include a non-mobile device, for example, a Personal Computer (PC), a desktop computer, a dedicated charger device, a vehicular device, a car charger, an on-board device, an off-board device, a consumer device, a video device, an audio device, an A/V device, or the like.

In other embodiments, device 110 may include a mobile device, for example, a mobile charger, a charger pad, a charger plate, a charger board, a charger cover, a charger mat, a charging case, a charging sleeve, a mobile phone, a Smartphone, a watch, a mobile computer, a laptop computer, a tablet computer, an Ultrabook™ computer, a notebook computer, a video device, a display device, a handheld computer, a handheld device, a PDA device, a handheld PDA device, a hybrid device (e.g., combining cellular phone functionalities with PDA device functionalities), a consumer device, a vehicular device, a non-vehicular device, a mobile or portable device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, an audio device, an A/V device, a Personal Media Player (PMP), a digital video camera (DVC), a digital audio player, a Digital Still camera (DSC), a media player, a music player, or the like.

In one example, device 110 may include a first mobile device, for example, a mobile computer, e.g., an Ultrabook™ computer, a laptop computer or a notebook computer, and device 150 may include a second mobile device, e.g., a mobile phone, another mobile computer, and the like.

In another example, device 110 may include a mobile computer, e.g., an Ultrabook™ computer, a laptop computer or a notebook computer, and device 150 may include a peripheral of the mobile computer, e.g., a wireless keyboard, a wireless mouse, a wireless microphone, a wireless speaker, a wireless joystick, and the like.

In another example, device 110 may include a stationary device, e.g., PC or a desktop computer, and device 150 may include a peripheral of the stationary device, e.g., a wireless keyboard, a wireless mouse, a wireless microphone, a wireless speaker, a wireless joystick, and the like; or a mobile device to be charged by the stationary device, e.g., a mobile phone, a mobile computer, and the like.

In other embodiments, devices 110 and/or 150 may include any other combination of mobile or non-mobile devices.

In some demonstrative embodiments, WPT 112 may be configured to transmit power signal 102, for example, upon detecting an object, e.g., device 150, is within a predefined area ("the charging area") in proximity to or in contact with device 110, e.g., such that wireless power signal 102 may be effectively received by WPR 152.

In some demonstrative embodiments, WPR 152 may receive wireless power signal 102 and may charge battery 191 of device 150 and/or provide power to operate one or more components 195 of device 150.

In some demonstrative embodiments, WPT 112 may include a Power Amplifier (PA) 122 to amplify power received from a power supply 120.

In one example, power supply 120 may include an internal power supply of device 110, e.g., a battery of device 110.

In another example, power supply 120 may include a wall adapter and/or a converter, e.g., a Direct Current (DC) to DC (DC2DC) converter or an Alternating Current AC to DC (AC2DC) converter to convert electric power received from an external power source, e.g., via a power cord or cable.

In some demonstrative embodiments, WPT 112 may include a Transmitter (Tx) resonator 126 configured to convert the electric power from PA 122 into wireless charging signal 102, e.g., in the form of a Radio Frequency (RF) signal. For example, Tx resonator 126 may include a magnetic field generator capable of generating charging signal 102 in response to the power provided by PA 122. In one example, Tx resonator 126 may include a coil or an electrical conducting wire.

In some demonstrative embodiments, WPT 112 may include a matching network 124 to match an electric impedance between PA 122 and TX resonator 126, e.g., to maximize a power transfer between PA 122 and Tx resonator 126 and/or to minimize reflections from Tx resonator 126.

In some demonstrative embodiments, WPR 152 may include a Receiver (Rx) resonator 166 configured to convert wireless charging signal 102 into a power signal. For example, Rx resonator 166 may include a coil.

In some demonstrative embodiments, WPR 152 may include a DC2DC converter to convert the power signal received by Rx resonator 166 into a power signal suitable for load 193, e.g., to charge battery 191 and/or to power one or more components 195 of device 150.

In some demonstrative embodiments, WPR 152 may include a matching network 164 to match the electrical impedance between RX resonator 166 and load 193, e.g., to maximize a power transfer between Rx resonator 166 and load 193 and/or to minimize reflections from load 193.

In some demonstrative embodiments, WPT 112 may include a controller 114 to control one or more operations of WPT 112, for example, by controlling current provided to Tx resonator 126 for generating wireless power signal 102, e.g., as described below.

In some demonstrative embodiments, WPR 154 may include a controller 154 to control one or more operations of WPR 152, for example, by communicating with WPT 112, e.g., as described below.

In some demonstrative embodiments, WPT 112 and WPR 152 may be configured to communicate over wireless communication signals 104, which may carry information communicated between WPT 112 and WPR 152. For example, device 110 may include a wireless communication module 116 and/or device 150 may include a wireless communication module 156 to communicate signals 104.

In some demonstrative embodiments, wireless communication modules 116 and 156 may include Infra-Red (IR) communicate modules to signals 104 in the form of IR signals. In other embodiments, wireless communication modules 116 and 156 may include any other wireless communication modules, e.g., Bluetooth (BT) communication modules, Wireless Fidelity (WiFi) communication modules, millimeter wave (mmWave) communication modules, Wireless Gigabit (WiGig) communication modules, Near Field Communication (NFC) modules, and the like.

In some demonstrative embodiments, wireless communication module 116 may be included as part of WPT 112 and/or wireless communication module 156 may be included as part of WPR 152, e.g., as shown in FIG. 1. In other embodiments, wireless communication module 116 may be included as part of a wireless communication module 140 of device 110 and/or wireless communication module 156 may be included as part a wireless communication module 190 of device 150.

In some demonstrative embodiments, wireless communication modules 116 and 156 may utilize signals 104 for unidirectional or bidirectional communication.

In some demonstrative embodiments, wireless communication module 156 may include an IR transmitter configured to transmit information from WPR 152 via signals 104, and wireless communication module 116 may include an IR receiver to receive signals 104 at WPT 112. A variety of information may be transmitted between WPR 152 and WPT 112 via signals 104. For example, upon sensing wireless power signal 102, WPR 152 may transmit initialization information to WPT 112, e.g., device identification and/or type, charging system tolerances, and the like, to configure WPT 112. The configuration of WPT 112 may allow device 150 to be charged, for example, in an efficient and/or safe manner. WPR 152 may continue to communicate with WPT 112, for example, to provide to WPT 112 updates on the charge level of device 150, to request WPT 112 to increase or decrease the charge power, to alert WPT 112 as to any events that are detected by WPR 152, e.g., problems, malfunctions, and the like, to inform WPT 112 that charging is complete so that WPT 112 may discontinue transmission of power signal 102, e.g., to save power, and the like.

In some demonstrative embodiments, wireless communication module 156 and wireless communication module 116 may perform bidirectional communication via signals 104. For example, wireless communication modules 116 and 156 may include a wireless transceiver, e.g., an IR transceiver, to transmit and receive signals 104. The bidirectional communication may be utilized by WPT 112, for example, to inform WPR 152 of the capabilities of WPT 112, to indicate to WPR 152 that charging is about to commence or that charging is initiated, to acknowledge receipt of transmissions from WPR 152, to provide alerts to WPR 152 in regard to problematic events in WPT 112, and the like.

In one example, controller 154 may control wireless communicate module 156 to communicate to WPT 112 signals 104 indicative of a status of wireless power signal 102 received by WPR 152 and/or signals 104 indicative of a power condition of device 150. For example, signals 104 may include a notification that wireless power signal 102 is being received by WPR 152, is not being received by WPR 152, and/or a request to increase or decrease the power of wireless power signal 102. Additionally or alternatively, signals 104 may include notification of a current power level of battery 191, an estimated time until battery 191 is to be at full charge, problems being experienced with device 150, and the like.

In one example, WPT 112 may receive signals 104 indicating the status of wireless power signal 102 received by WPR 152 and/or the power condition of device 150, and controller 114 may control wireless power signal 102 and/or communicate signals 104 based on the signals 104 received from WPR 152. For example, controller 114 may control WPT 112 to start or stop transmission of wireless power signal 102, and/or to increase or decrease the power of wireless power signal 102. Controller 104 may, for example, control wireless communication module 116 to transmit signals 104, e.g., to acknowledge receipt of the indications from WPR 152, to indicate transmission of wireless power signal 102 is to start or stop, to indicate the increase or decrease in the power of wireless power signal 102, and/or to provide information to WPR 152.

In some demonstrative embodiments, device 110 may also include, for example, one or more of a processor 134, an input unit 130, an output unit 132, a memory unit 136, a storage unit 138, and/or wireless communication module 140. Device 150 may also include, for example, one or more of a processor 184, an input unit 180, an output unit 182, a memory unit 186, a storage unit 188, and/or wireless communication module 190. Devices 110 and/or 150 may optionally include other suitable hardware components and/or software components. In some demonstrative embodiments, some or all of the components of device 110 and/or device 150 may be enclosed in a common housing or packaging, and may be interconnected or operably associated using one or more wired or wireless links. In other embodiments, components devices 110 and/or 150 may be distributed among multiple or separate devices.

Processor 134 and/or processor 184 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 134 may execute instructions, for example, of an Operating System (OS) of device 110 and/or of one or more suitable applications; and/or processor 184 may execute instructions, for example, of an OS of device 150 and/or of one or more suitable applications.

Input unit 130 and/or input unit 180 includes, for example, a keyboard, a keypad, a mouse, a touch-screen, a touch-pad, a track-ball, a stylus, a microphone, or other suitable pointing device or input device. Output unit 132 and/or output unit 182 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 136 and/or memory unit 186 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 138 and/or storage unit 188 includes, for example, a hard disk drive, a floppy disk drive, a Compact Disk (CD) drive, a CD-ROM drive, a DVD drive, or other suitable removable or non-removable storage units. Memory unit 136 and/or storage unit 138, for example, may store data processed by device 110; and/or memory unit 186 and/or storage unit 188, for example, may store data processed by device 150.

In some demonstrative embodiments, wireless communication modules 116, 140, 156 and/or 190 may include one or more radios, e.g., including one or more wireless transmitters, receivers and/or transceivers able to send and/or receive wireless communication signals, IR signals, Bluetooth signals, RF signals, frames, blocks, transmission streams, packets, messages, data items, and/or data. For example, wireless communication modules 116, 140, 156 and/or 190 may include or may be implemented as part of a wireless Network Interface Card (NIC), and the like.

Figure 2:
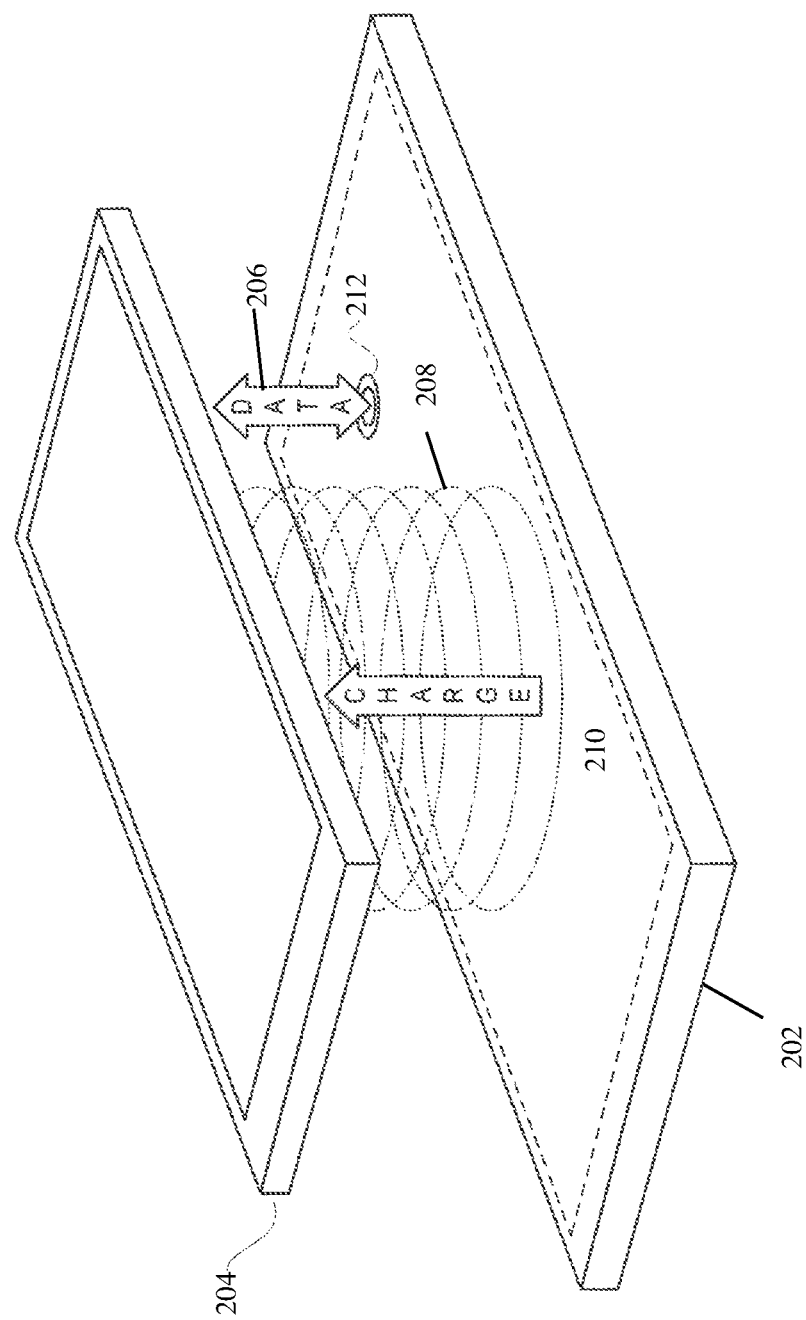
FIG. 2 is schematic illustration of devices engaged in wireless power transfer, in accordance with some demonstrative embodiments.

Reference is made to FIG. 2, which schematically illustrates a first device 202 engaged in wireless power transfer with a second device 204, in accordance with some demonstrative embodiments. For example, device 202 may perform the functionality of device 110 (FIG. 1) and/or device 204 may perform the functionality of device 150 (FIG. 1).

In some demonstrative embodiments, device 202 may be configured to sense when device 203 is physically placed within charging range, for example, by detecting changes in load, e.g., as described in detail below.

In some demonstrative embodiments, device 212 may include at least one charging signal transmitter 210 to transmit a wireless charging signal 208 to charge device 204, e.g., when device 204 is placed in proximity to or in contact with device 202, e.g., based on an effective range of the charging signal 208. For example, charging signal transmitter 210 may perform the functionality of Tx resonator 126 (FIG. 1) and/or wireless charging signal 208 may perform the functionality of wireless power signal 102 (FIG. 1).

In some demonstrative embodiments, device 204 may utilize charging signal 208 to charge a power source and/or to operate one or more components of device 204. For example, charging signal 208 may include an RF signal, which may induce current in a coil, e.g., Rx resonator 166 (FIG. 1), within device 204, and the current may be used to charge a battery of device 204, e.g., battery 191 (FIG. 1), and/or to power one or more components of device 204, e.g., components 195 (FIG. 1).

In some demonstrative embodiments, device 212 may include a wireless communication unit 212 to communicate data 206 with device 204, e.g., as described above. For example, wireless communication unit 212 may perform the functionality of wireless communication module 116 (FIG. 1).

Figure 3:
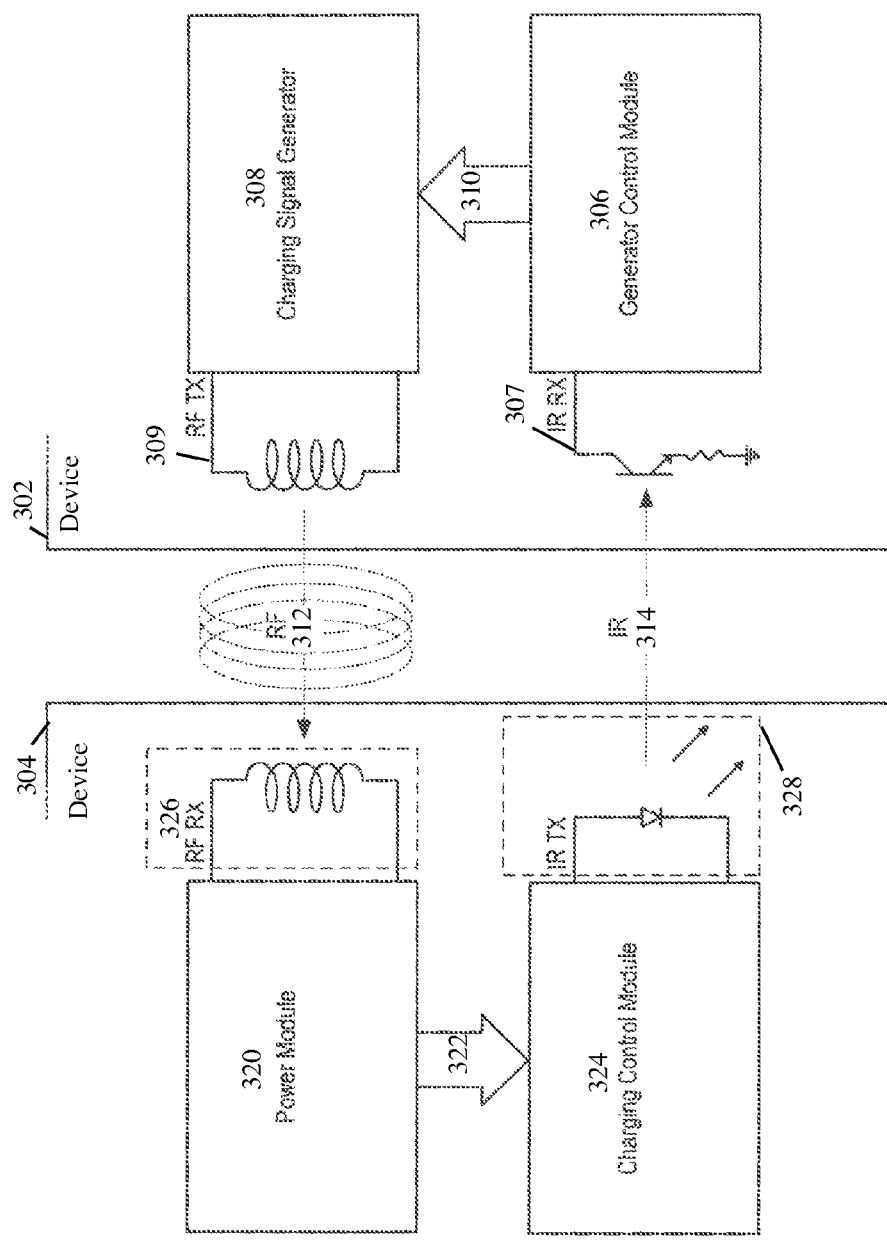
FIG. 3 is a schematic illustration of a power transfer interaction scheme between two devices, in accordance with some demonstrative embodiments.

Reference is made to FIG. 3, which schematically illustrates a power transfer interaction scheme between a first device 302 and a second device 304, in accordance with some demonstrative embodiments. For example, device 302 may perform the functionality of device 110 (FIG. 1) and/or device 304 may perform the functionality of device 150 (FIG. 1).

In some demonstrative embodiments, device 302 may include a generator control module 306 to control a charging signal generator 308, e.g., using a control signal 310. For example, generator control module 306 may perform the functionality of controller 114 (FIG. 1) and/or charging signal generator 308 may perform the functionality of one or more elements of WPT 112 (FIG. 1).

As shown in FIG. 3, in response to control signal 310, charging signal generator 308 may, for example, generate a charging signal 312, e.g., a RF charging signal, which may be emitted by an RF transmitter (TX) 309 of device 302. For example, RF transmitter 309 may perform the functionality of Tx resonator 126 (FIG. 1) and/or charging signal 312 may perform the functionality of wireless power signal 102 (FIG. 1).

In some demonstrative embodiments, device 304 may include a RF receiver (Rx) 326 to receive charging signal 312. For example, RF receiver 326 may include a coil configured to receive the charging signal 312 and to generate a current to be used by a load of device 304, for example, for charging power resources of device 304, e.g., battery 191 (FIG. 1). For example, RF receiver 326 may perform the functionality of Rx resonator 166 (FIG. 1).

In some demonstrative embodiments, device 304 may include a power module 320 to handle the power received via charging signal 312. For example, power module 320 may perform the functionality of one or more elements of WPR 152 (FIG. 1).

In some demonstrative embodiments, device 304 may include charging control module 324 to control a charging of device 304. For example charging control module 324 may perform the functionality of controller 154 (FIG. 1).

In some demonstrative embodiments, power module 320 may provide indications 322 to charging control module 324, e.g., to indicate a status of charging signal 312, a power condition of device 304, and the like. Charging control module 324 may determine information to be transmitted to device 302, e.g., based on signals 322. Charging control module 324 may utilize a close-proximity transmitter 328 to transmit a signal 314, e.g., an IR signal, to device 302.

In some demonstrative embodiments, generator control module 306 may receive signal 314, and may control charging signal generator 308, for example, based on information, e.g., status and/or instructions, included in signal 314. For example, generator control module 306 may cause charging signal generator 308 to start/stop generation of signal 312, to increase or decrease the power of signal 312, and the like.

In some demonstrative embodiments, the demonstrative interactions shown in FIG. 3 may continue, for example, while device 304 is charging, until device 304 is removed, e.g., moved out of range of signal 312, until a problem is detected by device 302 and/or device 304, and/or until any other criterion is met.

Referring back to FIG. 1, in some demonstrative embodiments a standby power consumption of WPT 112 may be relatively high, for example, if WPT 112 is configured to transmit signal 102, during long standby periods, e.g., while device 150 is not utilizing signal 102 for charging.

In some demonstrative embodiments, utilizing data communication between devices 110 and 150 to enable device 110 to determine when device 150 is within charging range, may require establishing a communication link between devices 110 and 150. Accordingly, such a solution may not be efficient in terms of power consumption, time consumption and/or transparency to a user of device 150.

In some demonstrative embodiments, WPT 112 may be configured to detect device 150 without and/or prior to establishing a communication link between devices 110 and 150, e.g., as described below.

In some demonstrative embodiments, WPT 112 may be configured to sense when a power receiver, e.g., WPR 152, is physically placed within the charging range of WPT 112, for example, by detecting changes in load on Tx resonator 126, e.g., as described below.

In some demonstrative embodiments, enabling WPT 112 to sense when a power receiver, e.g., WPR 152, is physically placed within the charging range of WPT 112, for example, without using a communication channel between devices 110 and 150, may enable, for example, reducing standby power consumption of WPT 112.

In some demonstrative embodiments, controller 114 may be configured to detect WPR 152 based on changes in mutual inductance, which may result from device 150 being placed within the charging range of wireless power signal 102.

In some demonstrative embodiments, controller 114 may detect WPR 152 based on a detected induced load on WPT 112 during transmission of one or more signals via Tx resonator 126, e.g., as described in detail below.

In some demonstrative embodiments, controller 114 may control WPT 112 to operate at a search state (also referred to a "low power search") to search for at least one WPR, e.g., WPR 152.

In some demonstrative embodiments, at the search state controller 114 may control WPT 112 to operate at a detection phase ("detection mode") to detect at least one WPR, e.g., WPR 152.

In some demonstrative embodiments, controller 114 may control WPT 112 to operate at a charging phase ("charging mode"), for example, upon detecting the WPR. During the charging phase, WPT 112 may transmit wireless power signal 102 the detected WPR, e.g., as described above.

In some demonstrative embodiments, the detection phase may be configured to enable WPT 112 to detect WPR 152, for example, without requiring devices 110 and 150 to establish a communication link.

In some demonstrative embodiments, WPT 112 may establish a communication link with WPR 152 after detecting WPR 152.

For example, controller 114 may operate WPT 112 at the detection phase, during which controller 114 may control Tx resonator 126 to generate short pulses of energy probes ("probe events") to detect if WPR 152 is within charging range of WPT 112. Upon detecting WPR 152, controller 114 may operate WPT 112 at the charging phase, during which controller 114 may control Tx resonator 126 to transmit charging signal 102, e.g., continuously, to initiate operation and/or charging of WPR 152. Controller 114 may communicate with controller 154 of WPR 152, e.g., via signals 104, as described above.

In some demonstrative embodiments, the detection phase may be configured to reduce a power consumption of WPT 112 during a detection period, e.g., while searching for WPT 152 and/or until detecting the WPT.

In some demonstrative embodiments, controller 114 may control WPT 112 to operate at a reduced power mode ("Low Power Sleep state"), e.g., between the probe events. For example, during the low power sleep state may a majority of functionalities of WPT 112 may be suspended, for example, while keeping a reduced number standby functionalities of WPT 112 active. The standby functionalities may include, for example, functionalities enabling WPT 112 to wake up and/or to monitor messages, e.g., status messages, from a host of device 110, for example, over a host interface, e.g., an Inter-Integrated Circuit (I²C) interface or any other interface. Controller 114 may control WPT 112 to switch from the low power sleep state to an active mode ("active state"), for example, in order to transmit the probe events.

In some demonstrative embodiments, the detection phase may be configured to enable WPT 112 to perform a low power search to detect WPR 152.

In some demonstrative embodiments, controller 114 may control WPT 112 to transmit a sequence of probe energy pulses ("probes") during the detection period, e.g., as described below.

In some demonstrative embodiments, controller 114 may control WPT 112 to transmit the sequence of probes in the form of short pulses of signals 102. For example, controller 114 may control Tx resonator 126 to transmit short pulses of energy during the detection period.

In some demonstrative embodiments, controller 114 may control WPT 112 to generate the sequence of probes by controlling WPT 112 to supply a sequence of short pulses of energy to Tx resonator 126.

In some demonstrative embodiments, the power consumption of WPT 112 during the detection phase may be related to the energy for generating the sequence of probes. Accordingly, reducing the duration of each probe, reducing the energy of each probe and/or increasing a time period between the probes may enable reducing the power consumption of WPT 112.

In some demonstrative embodiments, controller 114 may control WPT 112 to generate the sequence of probes, for example, such that each probe may have a duration of less than 3 milliseconds.

In some demonstrative embodiments, the duration of the probe may be 100 microseconds or less.

In some demonstrative embodiments, controller 114 may control WPT 112 to generate the sequence of probes, for example, such that an energy level of each probe is lesser than an energy level of wireless charging signal 112, e.g., when charging WPR 152.

In some demonstrative embodiments, controller 114 may control WPT 112 to generate the sequence of probes, for example, such that two consecutive probes of the sequence of probes are separated by at least one second.

In some demonstrative embodiments, controller 114 may detect WPR 152 based on a detected induced load on WPT 112 during transmission of a probe.

In some demonstrative embodiments, controller 114 may detect the induced load on WPT 112, for example, by detecting a change in an impedance of WPT 112 during the probe.

In some demonstrative embodiments, a current flow via PA 122 may increase as a result of an object being placed within the charging area during the probe.

In some demonstrative embodiments, controller 114 may detect the induced load on WPT 112, for example, by detecting a change in a current flow in power amplifier 122 during the probe, e.g., as described below.

In some demonstrative embodiments, controller 114 may control WPT 112 to apply to Tx resonator 126 a predefined current ("probe current") configured to generate the probe having sufficient energy to enable controller 114 to detect an impedance change WPT 112 caused by placement of an object within the charging area.

In some demonstrative embodiments, WPT 112 may include a detector 118 to detect changes in the current flow in power amplifier 122 during transmission of the probe.

In some demonstrative embodiments, detector 118 may include a peak detector configured to detect one or more peaks of the current flow in power amplifier 122, e.g., as described below.

In some demonstrative embodiments, controller 114 may detect WPR 152 based on the one or more peaks detected by detector 118.

In some demonstrative embodiments, detector 118 may include any other detector to detect the induced load on WPT 112. For example, detector 118 may be configured to measure reflected power and/or changes in voltage across Tx resonator 126 during the probe. In other embodiments, any other detection technique may be utilized to detect the induced load on WPT 112.

In some demonstrative embodiments, detector 118 may be configured to detect the one or more peaks of the current flow in power amplifier 122 within a relatively short period of time corresponding to the duration of the probe.

In one example, detector 118 may be configured to detect the one or more peaks of the current flow in power amplifier 122 within a period of less than 3 milliseconds, e.g., if the probe has a duration of less than 3 milliseconds.

For example, detector 118 may be configured to detect the one or more peaks of the current flow in power amplifier 122 within a period of less than 100 microseconds, e.g., if the probe has a duration of less than 100 microseconds.

Figure 4:
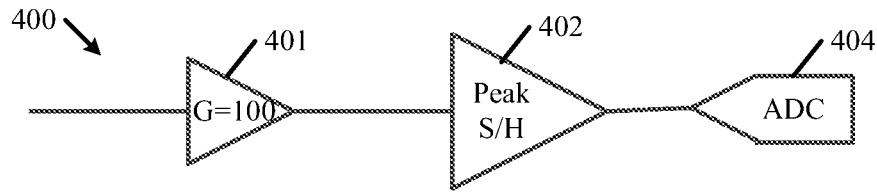
FIG. 4 is a schematic illustration of a detector, in accordance with some demonstrative embodiments.

Reference is made to FIG. 4, which schematically illustrates a detector 400, in accordance with some demonstrative embodiments. For example, detector 400 may perform the functionality of detector 118 (FIG. 1).

In some demonstrative embodiments, detector 400 may include a sample and hold (S/H) circuit 402 configured to sample a current at a source circuit of a PA 401. For example, PA 401 may perform the functionality of PA 122 (FIG. 1). Sample and hold circuit 402 may be connected to an Analog to Digital Converter (ADC) 404, which may be configured to enable sample and hold circuit 402 to detect peaks in the current at PA 401.

In some demonstrative embodiments, a current flowing through PA 401 may increase, for example, when WPR 152 (FIG. 1) is placed in proximity to WPT 112 (FIG. 1), for example, as a result of the load induced by WPR 152 on WPT 112 (FIG. 1).

In some demonstrative embodiments, the current flow through PA 401 may be detected, for example, using short pulses of sufficient peak power. In one example, a sampling resistor, e.g., a 0.1 Ohm resistor, may be placed in a source circuit of PA 401, for example, to measure the current through PA 401. A voltage on the sampling resistor may indicate the current flow through PA 401. For example, there may be a voltage of about 50 milliVolt (mV), e.g., relative to ground, for example, when a current of about 500 milliAmpere (mA) is flowing through PA 401. Detector 401 may be scaled for higher or lower power systems, for example, by altering the resistor value to obtain a sampled voltage within a range of ADC circuit 404.

Referring back to FIG. 1, in some demonstrative embodiments, the search state may be configured to enable WPT 112 to have a reduced power consumption during standby, for example, to enable WPT 112 to have an average power consumption of less than 10 milliwatt (mW), for example, 5 mW or less, when searching for a device to charge.

In some demonstrative embodiments, controller 114 may control WPT 112 to generate the sequence of probes according to a predefined detection scheme, e.g., as described below.

Following is a demonstrative analysis of the average power consumption of a WPT, e.g., WPT 112, during the detection phase, in accordance with some demonstrative embodiments. In other embodiments, WPT 112 may have any other power consumption and/or may operate according to any other detection scheme.

In some demonstrative embodiments, the power consumption of WPT 112 during the detection phase may be estimated based on the energy consumed by WPT 112 per second, when searching for a WPR according to the detection scheme.

In one example, the power consumption, denoted Power, of WPT 112 during the search state may be determined as follows:

$$\text{Power} = \text{Probe\_energy} + \text{Baseline\_measurement} + \text{Status\_check} \quad (1)$$

wherein Probe_energy denotes an energy consumed by WPT 112 during a probe event, which may include probe transmission and measurement of the peak current of PA 122 to detect the WPR; wherein Baseline_measurement denotes an energy consumed by WPT 112 to measure the peak current hen no WPR is detected, e.g., as described below; and wherein Status_check denotes an energy consumed by periodic status checks from the host of device 110, e.g., via an I²C interface or any other interface.

In some demonstrative embodiments, the detection scheme may include probe pulses generated at a rate of one probe per second, e.g., such that each pair of consecutive probe pulses are separated by one second. The detection scheme may also include a duration of 100 microseconds (us) per probe. In other embodiments, the probe pulses may be generated according to any other detection scheme include any other probe duration and/or any other probe rate.

In some demonstrative embodiments, the energy Probe_energy consumed by a probe event may include energy consumed by one or more elements of WPT 112, when transitioning from the low power sleep state to the active state, e.g., prior to transmitting the probe. For example, the energy Probe_energy consumed by the probe event may include energy consumed by controller 119 to transition from the low power sleep state to the active state, and energy to activate clock sources of WPT 112.

In some demonstrative embodiments, an energy, denoted Input_energy, to charge elements of power supply 120, for example, DC filter capacitors on an output of a main regulator of power supply 120, may be determined, for exampled based on an energy, denoted Stored_energy, stored by the DC filter capacitors and an efficiency, denoted Conversion_effieicncy. For example, the energy Input_energy may be determined as follows, for example, when PA 122 is to be operated at 10 Volt (V):

$$\text{Stored\_energy} = (\tfrac{1}{2})^{*}CV^{2} = 0.5^{*}46.8 \text{ uF}^{*}10^{2} = 2.34 \text{ milliJoule (mJ)} \quad (2)$$

$$\text{Input\_energy} = \text{Stored\_energy}/\text{Conversion\_efficiency} = (2.34 \text{ mJ})/(0.7) = 3.34 \text{ mJ} \quad (3)$$

In some demonstrative embodiments, a pulse energy, denoted Pulse_energy, to transmit a probe pulse may be determined, for example, if a current of 80 mA is used, as follows:

$$\text{Pulse\_energy} = 10V^{*}80 \text{ mA}^{*}100 \text{ us} = 0.8 \text{ mJ} \quad (4)$$

In some demonstrative embodiments, the energy Input_energy stored by the capacitors of power supply 120, which may be 3.34 mJ, per Equation 3, may be greater than the energy of 0.8 mJ, which may be used by the probe pulse, per Equation 4. Accordingly, power supply 120 may be optimized, for example, to reduce the energy Input_energy, and thereby to further reduce a power consumption of WPT 112.

In some demonstrative embodiments, the following Table summarizes the energy consumed by WPT 112 during a time period between waking up for a probe event, generating the probe, and returning to the low power sleep state, e.g., until a next probe event:

TABLE 1

| Event | Estimated Energy Required [mJ] | Description | Notes |
|---|---|---|---|
| Wake up from Low Power Sleep state | 0.63 | 2.5 ms in Active state to start clock source(s) | Active state for 2.5 ms |
| TX regulator charges filter caps | 3.34 | Energy to charge filter caps 46.8 uF at 70% eff, ½ C*V 2 | |
| uC energy consumed during probe event | 0.75 | Send pulse and measure peak current | Active for 3 ms |
| Energy consumed in Low Power Sleep state between probe events | 0.05 | 10 uA * 5 V | Presuming 1 probe per second |
| Total Energy consumed per probe event | 4.77 | | |
| Pulse time | 1.00E−04 | 100 us | |

In some demonstrative embodiments, controller 114 may detect WPR 152 based on a comparison of a peak current of PA 122, e.g., as detected by detector 118, during the probe, and a peak current ("baseline peak current") when no device is present.

In some demonstrative embodiments, the baseline peak current may be measured, for example, by ADC 404 (FIG. 4) using peak sample and hold circuit 402 (FIG. 4), e.g., as described above.

In some demonstrative embodiments, controller 114 may control WPT 112 to wake up from the Low Power Sleep state, e.g., once per minute, to generate a probe, for example, by enabling Tx resonator 126, e.g., at 10V for 80 ms, and to measure the peak current, e.g., as described above. Controller 114 may determine whether the detected peak current indicates detection of WPR 152, e.g., by comparing the measured peak current to the baseline peak current.

In some demonstrative embodiments, controller 114 may control WPT 112 to commence to the charging phase, for example, upon determining that WPR 152 is detected.

In some demonstrative embodiments, controller 114 may update the baseline peak current, for example, if WPR 152 is not detected. For example, controller 114 may set the baseline peak current to the measured peak current.

In some demonstrative embodiments, the energy Baseline_measurement consumed for the baseline peak current measurement may be determined as follows, e.g., assuming one measurement of the baseline peak current per minute:

$$\text{Baseline\_measurement} = (10V^{*}80 \text{ mA}^{*}80 \text{ ms})/(60 \text{ seconds}) = 1.07 \text{ mJ per second} \quad (5)$$

In some demonstrative embodiments, the average power consumption of WPT 112 may be affected by a rate of activity on the interface with the host of device 110. For example, an activity on the I²C bus ("status check") may cause a brief transition of WPT 112 to an active state, during which controller 114 may consume increased power.

In some demonstrative embodiments, the energy Status check consumed by WPT 112 as a result of the activity over the host interface may be determined as follows, e.g., assuming one status check activity per second:

$$\text{Status\_check} = 5V \times 50 \text{ mA} \times 3 \text{ ms} = 0.75 \text{ mJ}. \quad (6)$$

In some demonstrative embodiments, the total energy consumption of WPT 112 may be determined, for example, by substituting the values of Probe_energy, Baseline_measurement, and Status_check, as determined above, e.g., as follows:

$$\text{Power} = 4.77(\text{mJ/sec}) + 1.07(\text{mJ/sec}) + 0.75(\text{mJ/sec}) = 6.59 \text{ mW} \quad (7)$$

Figure 5:
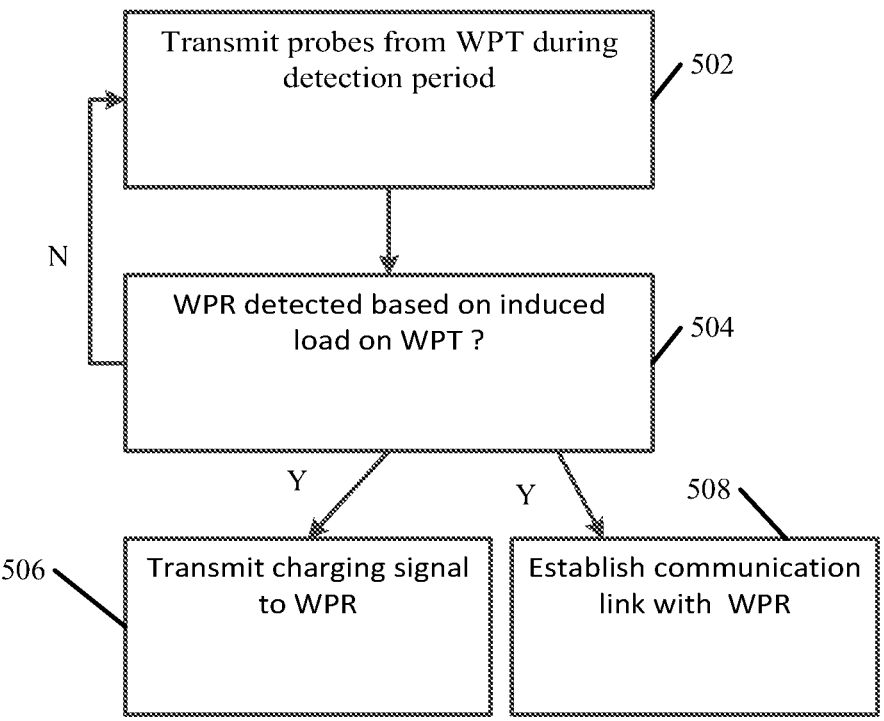
FIG. 5 is a schematic flow-chart illustration of a method of wireless power transfer, in accordance with some demonstrative embodiments.

FIG. 5 is a schematic flow-chart illustration of a method of wireless power transfer, in accordance with some demonstrative embodiments. In some demonstrative embodiments, one or more of the operations of the method of FIG. 5 may be performed by one or more elements of a system, e.g., system 100 (FIG. 1), a device, e.g., devices 110 and/or 150 (FIG. 1), a WPT, e.g., WPT 112 (FIG. 1), a WPR, e.g., WPR 152 (FIG. 1) and/or a controller, e.g., controller 114 (FIG. 1) and/or controller 154 (FIG. 1).

As indicated at block 502, the method may include transmitting by a WPT a sequence of probes during a detection period. For example, controller 114 (FIG. 1) may operate WPT 112 (FIG. 1) at the detection phase by controlling WPT 112 (FIG. 1) to transmit a sequence of probe pulses, e.g., as described above.

As indicated at block 504, the method may include detecting a WPR based on a detected induced load on the WPT during transmission of a probe of the sequence of probes. For example, controller 114 (FIG. 1) may detect WPR 152 (FIG. 1) based on a detected induced load on WPT 112 (FIG. 1) during transmission of a probe, e.g., as described above.

As indicated at block 506, the method may include transmitting a wireless charging signal from the WPT to the WPR, e.g., upon detection of the WPR. For example, controller 114 (FIG. 1) may control WPT 112 (FIG. 1) to operate at the charging phase, for example, to transmit wireless power signal 102 (FIG. 1), e.g., as described above.

As indicated at block 508, the method may include establishing a communication link between the WPT and WPR, e.g., after detecting the WPR. For example, controller 114 (FIG. 1) may control wireless communication module 116 (FIG. 1) to establish a wireless communication link with WPR 152 (FIG. 1), after detecting WPR 152 (FIG. 1), e.g., as described above.

Figure 6:
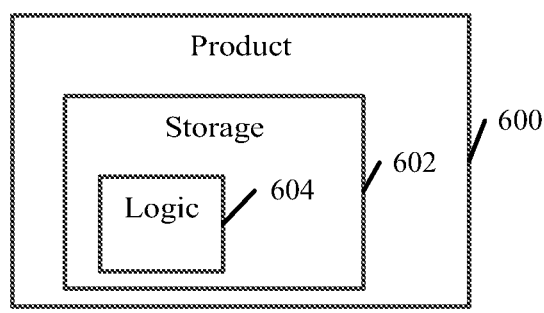
FIG. 6 is a schematic illustration of a product of manufacture, in accordance with some demonstrative embodiments.

Reference is made to FIG. 6, which schematically illustrates a product of manufacture 500, in accordance with some demonstrative embodiments. Product 600 may include a non-transitory machine-readable storage medium 602 to store logic 604, which may be used, for example, to perform at least part of the functionality of device 110 (FIG. 1), device 150 (FIG. 1), WPT 112 (FIG. 1), controller 114 (FIG. 1), WPR 152 (FIG. 1), controller 154 (FIG. 1) and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a controller to control a Wireless Power Transmitter (WPT) to transmit a sequence of probes during a detection period, to detect a Wireless Power Receiver (WPR) based on a detected induced load on the WPT during transmission of a probe of the sequence of probes, and, upon detection of the WPR, to control the WPT to transmit a wireless charging signal to the WPR.

Example 2 includes the subject matter of Example 1, and optionally, wherein the controller is to detect the induced load by detecting a change in an impedance of the WPT during transmission of the probe.

Example 3 includes the subject matter of Example 1 or 2, and optionally, wherein the controller is to detect the induced load by detecting a change in a current flow in a power amplifier of the WPT during transmission of the probe.

Example 4 includes the subject matter of Example 3 and optionally, comprising a peak detector to detect one or more peaks of the current flow in the power amplifier, wherein the controller is to detect the WPR based on the one or more peaks.

Example 5 includes the subject matter of Example 4, and optionally, wherein the peak detector is configured to detect the one or more peaks within a period of less than 3 milliseconds.

Example 6 includes the subject matter of Example 5, and optionally, wherein the peak detector is configured to detect the one or more peaks within a period of less than 100 microseconds.

Example 7 includes the subject matter of any one of Examples 4-6, and optionally, wherein the peak detector comprises a sample and hold circuit.

Example 8 includes the subject matter of any one of Examples 1-7, and optionally, wherein the probe has a duration of less than 3 milliseconds.

Example 9 includes the subject matter of Example 8, and optionally, wherein the duration of the probe is 100 microseconds or less.

Example 10 includes the subject matter of any one of Examples 1-9, and optionally, wherein an energy level of the probe is lesser than an energy level of the wireless charging signal.

Example 11 includes the subject matter of any one of Examples 1-10, and optionally, wherein two consecutive probes of the sequence of probes are separated by at least one second.

Example 12 includes the subject matter of any one of Examples 1-11, and optionally, wherein the controller is to establish a communication link with the WPR after detecting the WPR.

Example 13 includes a system comprising a Wireless Power Transmitter (WPT) device including a power supply; a power amplifier to amplify power from the power supply; a transmit resonator to transmit signals using amplified power from the power amplifier; and a controller to control the transmit resonator to transmit a sequence of probes during a detection period, the controller is to detect a Wireless Power Receiver (WPR) based on a detected induced load on the WPT during transmission of a probe of the sequence of probes, and, upon detection of the WPR, to control the transmit resonator to transmit a wireless charging signal to the WPR.

Example 14 includes the subject matter of Example 13, and optionally, wherein the controller is to detect the induced load by detecting a change in an impedance of the WPT during transmission of the probe.

Example 15 includes the subject matter of Example 13 or 14, and optionally, wherein the controller is to detect the induced load by detecting a change in a current flow in the power amplifier during transmission of the probe.

Example 16 includes the subject matter of Example 15 and optionally, comprising a peak detector to detect one or more peaks of the current flow in the power amplifier, wherein the controller is to detect the WPR based on the one or more peaks.

Example 17 includes the subject matter of Example 16, and optionally, wherein the peak detector is configured to detect the one or more peaks within a period of less than 3 milliseconds.

Example 18 includes the subject matter of Example 17, and optionally, wherein the peak detector is configured to detect the one or more peaks within a period of less than 100 microseconds.

Example 19 includes the subject matter of any one of Examples 16-18, and optionally, wherein the peak detector comprises a sample and hold circuit.

Example 20 includes the subject matter of any one of Examples 13-19, and optionally, wherein the probe has a duration of less than 3 milliseconds.

Example 21 includes the subject matter of Example 20, and optionally, wherein the duration of the probe is 100 microseconds or less.

Example 22 includes the subject matter of any one of Examples 13-21, and optionally, wherein an energy level of the probe is lesser than an energy level of the wireless charging signal.

Example 23 includes the subject matter of any one of Examples 13-22, and optionally, wherein two consecutive probes of the sequence of probes are separated by at least one second.

Example 24 includes the subject matter of any one of Examples 13-23, and optionally, wherein the controller is to establish a communication link with the WPR after detecting the WPR.

Example 25 includes the subject matter of any one of Examples 13-24 and optionally, comprising a wireless charging device including the WPT device.

Example 26 includes a method comprising transmitting by a Wireless Power Transmitter (WPT) a sequence of probes during a detection period; detecting a Wireless Power Receiver (WPR) based on a detected induced load on the WPT during transmission of a probe of the sequence of probes; and upon detection of the WPR, transmitting a wireless charging signal from the WPT to the WPR.

Example 27 includes the subject matter of Example 26 and optionally, comprising detecting the induced load by detecting a change in an impedance of the WPT during transmission of the probe.

Example 28 includes the subject matter of Example 26 or 27 and optionally, comprising detecting the induced load by detecting a change in a current flow in a power amplifier of the WPT during transmission of the probe.

Example 29 includes the subject matter of Example 28 and optionally, comprising detecting one or more peaks of the current flow in the power amplifier, and detecting the WPR based on the one or more peaks.

Example 30 includes the subject matter of Example 29 and optionally, comprising detecting the one or more peaks within a period of less than 3 milliseconds.

Example 31 includes the subject matter of Example 30 and optionally, comprising detecting the one or more peaks within a period of less than 100 microseconds.

Example 32 includes the subject matter of any one of Examples 26-31, and optionally, wherein the probe has a duration of less than 3 milliseconds.

Example 33 includes the subject matter of Example 32, and optionally, wherein the duration of the probe is 100 microseconds or less.

Example 34 includes the subject matter of any one of Examples 26-33, and optionally, wherein an energy level of the probe is lesser than an energy level of the wireless charging signal.

Example 35 includes the subject matter of any one of Examples 26-34, and optionally, wherein two consecutive probes of the sequence of probes are separated by at least one second.

Example 36 includes the subject matter of any one of Examples 26-35 and optionally, comprising establishing a communication link with the WPR after detecting the WPR.

Example 37 includes a product including a non-transitory storage medium having stored thereon instructions that, when executed by a machine, result in transmitting by a Wireless Power Transmitter (WPT) a sequence of probes during a detection period; detecting a Wireless Power Receiver (WPR) based on a detected induced load on the WPT during transmission of a probe of the sequence of probes; and upon detection of the WPR, transmitting a wireless charging signal from the WPT to the WPR.

Example 38 includes the subject matter of Example 37, and optionally, wherein the instructions result in detecting the induced load by detecting a change in an impedance of the WPT during transmission of the probe.

Example 39 includes the subject matter of Example 37 or 38, and optionally, wherein the instructions result in detecting the induced load by detecting a change in a current flow in a power amplifier of the WPT during transmission of the probe.

Example 40 includes the subject matter of Example 39, and optionally, wherein the instructions result in detecting one or more peaks of the current flow in the power amplifier, and detecting the WPR based on the one or more peaks.

Example 41 includes the subject matter of Example 40, and optionally, wherein the instructions result in detecting the one or more peaks within a period of less than 3 milliseconds.

Example 42 includes the subject matter of Example 41, and optionally, wherein the instructions result in detecting the one or more peaks within a period of less than 100 microseconds.

Example 43 includes the subject matter of any one of Examples 37-42, and optionally, wherein the probe has a duration of less than 3 milliseconds.

Example 44 includes the subject matter of Example 43, and optionally, wherein the duration of the probe is 100 microseconds or less.

Example 45 includes the subject matter of any one of Examples 37-44, and optionally, wherein an energy level of the probe is lesser than an energy level of the wireless charging signal.

Example 46 includes the subject matter of any one of Examples 37-45, and optionally, wherein two consecutive probes of the sequence of probes are separated by at least one second.

Example 47 includes the subject matter of any one of Examples 37-46, and optionally, wherein the instructions result in establishing a communication link with the WPR after detecting the WPR.

Example 48 includes an apparatus comprising means for transmitting by a Wireless Power Transmitter (WPT) a sequence of probes during a detection period; means for detecting a Wireless Power Receiver (WPR) based on a detected induced load on the WPT during transmission of a probe of the sequence of probes; and means for transmitting, upon detection of the WPR, a wireless charging signal from the WPT to the WPR.

Example 49 includes the subject matter of Example 48 and optionally, comprising means for detecting the induced load by detecting a change in an impedance of the WPT during transmission of the probe.

Example 50 includes the subject matter of Example 48 or 49 and optionally, comprising means for detecting the induced load by detecting a change in a current flow in a power amplifier of the WPT during transmission of the probe.

Example 51 includes the subject matter of Example 50 and optionally, comprising means for detecting one or more peaks of the current flow in the power amplifier, and detecting the WPR based on the one or more peaks.

Example 52 includes the subject matter of Example 51 and optionally, comprising means for detecting the one or more peaks within a period of less than 3 milliseconds.

Example 53 includes the subject matter of Example 52 and optionally, comprising means for detecting the one or more peaks within a period of less than 100 microseconds.

Example 54 includes the subject matter of any one of Examples 48-53, and optionally, wherein the probe has a duration of less than 3 milliseconds.

Example 55 includes the subject matter of Example 54, and optionally, wherein the duration of the probe is 100 microseconds or less.

Example 56 includes the subject matter of any one of Examples 48-55, and optionally, wherein an energy level of the probe is lesser than an energy level of the wireless charging signal.

Example 57 includes the subject matter of any one of Examples 48-56, and optionally, wherein two consecutive probes of the sequence of probes are separated by at least one second.

Example 58 includes the subject matter of any one of Examples 48-57 and optionally, comprising means for establishing a communication link with the WPR after detecting the WPR.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a controller configured to control a Wireless Power Transmitter (WPT) to transmit a sequence of probes during a detection period, to detect a Wireless Power Receiver (WPR) based on a detected induced load on said WPT during transmission of a probe of said sequence of probes, and, upon detection of said WPR, to control said WPT to transmit a wireless charging signal to said WPR, said controller is configured to detect said induced load by detecting a change in a current flow in a power amplifier of said WPT during transmission of said probe; and
   a peak detector configured to detect one or more peaks of the current flow in said power amplifier, wherein said controller is configured to detect said WPR based on said one or more peaks.

2. The apparatus of claim 1, wherein said controller is to detect said induced load by detecting a change in an impedance of said WPT during transmission of said probe.

3. The apparatus of claim 1, wherein said peak detector is configured to detect said one or more peaks within a period of less than 3 milliseconds.

4. The apparatus of claim 3, wherein said peak detector is configured to detect said one or more peaks within a period of less than 100 microseconds.

5. The apparatus of claim 1, wherein said peak detector comprises a sample and hold circuit.

6. The apparatus of claim 1, wherein said probe has a duration of less than 3 milliseconds.

7. The apparatus of claim 6, wherein the duration of the probe is 100 microseconds or less.

8. The apparatus of claim 1, wherein an energy level of said probe is lesser than an energy level of said wireless charging signal.

9. The apparatus of claim 1, wherein two consecutive probes of said sequence of probes are separated by at least one second.

10. The apparatus of claim 1, wherein said controller is to cause said WPT to establish a communication link with said WPR after detecting said WPR.

11. A system comprising:
a Wireless Power Transmitter (WPT) device including:
a power supply;
a power amplifier to amplify power from said power supply;
a transmit resonator to transmit signals using amplified power from said power amplifier;
a controller to control said transmit resonator to transmit a sequence of probes during a detection period, said controller is to detect a Wireless Power Receiver (WPR) based on a detected induced load on said WPT during transmission of a probe of said sequence of probes, and, upon detection of said WPR, to control said transmit resonator to transmit a wireless charging signal to said WPR, said controller is to detect said induced load by detecting a change in a current flow in said power amplifier during transmission of said probe; and
a peak detector to detect one or more peaks of the current flow in said power amplifier, said controller is to detect said WPR based on said one or more peaks.

12. The system of claim 11, wherein said probe has a duration of less than 3 milliseconds.

13. The system of claim 11 comprising a wireless charging device including said WPT device.

14. A method comprising:
transmitting by a Wireless Power Transmitter (WPT) a sequence of probes during a detection period;
detecting a Wireless Power Receiver (WPR) based on a detected induced load on said WPT during transmission of a probe of said sequence of probes, detecting said WPR comprising detecting said induced load by detecting one or more peaks of a current flow in a power amplifier of said WPT during transmission of said probe; and
upon detection of said WPR, transmitting a wireless charging signal from said WPT to said WPR.

15. The method of claim 14, wherein said probe has a duration of less than 3 milliseconds.

16. A product including a non-transitory storage medium having stored thereon instructions that, when executed by a machine, result in:
transmitting by a Wireless Power Transmitter (WPT) a sequence of probes during a detection period;
detecting a Wireless Power Receiver (WPR) based on a detected induced load on said WPT during transmission of a probe of said sequence of probes, the instructions, when executed, result in detecting said induced load by detecting one or more peaks of a current flow in a power amplifier of said WPT during transmission of said probe; and
upon detection of said WPR, transmitting a wireless charging signal from said WPT to said WPR.

17. The product of claim 16, wherein said instructions, when executed, result in detecting said one or more peaks within a period of less than 3 milliseconds.

18. The product of claim 16, wherein the instructions result in detecting said induced load by detecting a change in an impedance of said WPT during transmission of said probe.

19. The product of claim 16, wherein said probe has a duration of less than 3 milliseconds.

20. The product of claim 16, wherein an energy level of said probe is lesser than an energy level of said wireless charging signal.

21. The product of claim 16, wherein two consecutive probes of said sequence of probes are separated by at least one second.

* * * * *